(12) United States Patent
Gembrowski et al.

(10) Patent No.: US 11,230,316 B2
(45) Date of Patent: Jan. 25, 2022

(54) STAMPED METAL OUTER CAM FOR STEERING SYSTEM

(71) Applicant: Steering Solutions IP Holding Corporation, Saginaw, MI (US)

(72) Inventors: Peter A. Gembrowski, Freeland, MI (US); Randy W. Jones, North Branch, MI (US); Ethan S. Jacobs, Kawkawlin, MI (US); Tyler M. Reno, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/999,379

(22) Filed: Aug. 21, 2020

(65) Prior Publication Data

US 2021/0094604 A1 Apr. 1, 2021

Related U.S. Application Data

(60) Provisional application No. 62/908,161, filed on Sep. 30, 2019.

(51) Int. Cl.
*B62D 1/187* (2006.01)
*F16H 25/18* (2006.01)
*F16H 53/02* (2006.01)

(52) U.S. Cl.
CPC .......... *B62D 1/187* (2013.01); *F16H 25/186* (2013.01); *F16H 53/025* (2013.01)

(58) Field of Classification Search
None
See application file for complete search history.

(56) References Cited

U.S. PATENT DOCUMENTS

| 2013/0174685 | A1* | 7/2013 | Yamamoto | B62D 1/185 74/493 |
| 2017/0072986 | A1* | 3/2017 | Ishii | B62D 1/189 |
| 2019/0092368 | A1* | 3/2019 | Reno | B62D 1/185 |

* cited by examiner

*Primary Examiner* — Vicky A Johnson
(74) *Attorney, Agent, or Firm* — Dickinson Wright PLLC

(57) ABSTRACT

A rake adjustment assembly for a steering column system includes a rake lever that is rotatable. The rake adjustment assembly also includes a rake bolt operative coupled to the rake lever and positioned to selectively exert a clamping force to lock and unlock the rake position of the steering column system. The rake adjustment assembly further includes a cam assembly comprising an outer cam formed of stamped steel and press fit within a pocket defined by an outer face of the lever. The outer cam includes a main body. The outer cam also includes a plurality of legs extending from the main body.

20 Claims, 5 Drawing Sheets

STAMPED METAL OUTER CAM FOR STEERING SYSTEM

CROSS-REFERENCE TO RELATED APPLICATION

This application claims the benefit of priority to U.S. Provisional Patent Application Ser. No. 62/908,161, filed Sep. 30, 2019, the entire disclosure of which is incorporated by reference herein.

BACKGROUND

The following description relates to cam assemblies and, more particularly, to a stamped metal cam for such assemblies.

Cam assemblies are utilized in a variety of mechanical applications. Some cam assemblies include a cam and a cam follower. Cam followers come in a vast array of configurations, but each type of cam follower follows a cam lobe profile.

Steering systems most commonly use powdered metal locking cams to create bolt tension in the system. Many of these systems require the use of tight tolerance press fits with crush ribs and/or plastic over-molding to be connected to the lever assembly. These methods are used to ensure that the plastic portions of the lever are not in the clamp path to ensure no creep from the plastic lever over time. Newer lever assemblies attempt to utilize stamped steel components, reducing the cost of the parts. While these parts are less expensive, they need to add another part to retain the stamped steel follower on the outside of the lever assembly. This extra part can lead to issues with clamp forces needed to lock the column in addition to adding cost to the system that the stamped steel cam would have saved by replacing the powdered metal part.

SUMMARY OF THE DISCLOSURE

According to one aspect of the disclosure, a cam assembly for a steering system is provided. The cam assembly includes a lever. The cam assembly also includes an outer cam formed of stamped steel and press fit within a pocket defined by an outer face of the lever.

According to another aspect of the disclosure, a rake adjustment assembly for a steering column system is provided. The rake adjustment assembly includes a rake lever that is rotatable. The rake adjustment assembly also includes a rake bolt operative coupled to the rake lever and positioned to selectively exert a clamping force to lock and unlock the rake position of the steering column system. The rake adjustment assembly further includes a cam assembly comprising an outer cam formed of stamped steel and press fit within a pocket defined by an outer face of the lever. The outer cam includes a main body. The outer cam also includes a plurality of legs extending from the main body.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various features of a travel control system for a cam assembly are illustrated. In some embodiments, the cam assembly is employed in a steering column assembly of a vehicle. Numerous applications in a steering column assembly are contemplated.

Figure 1:
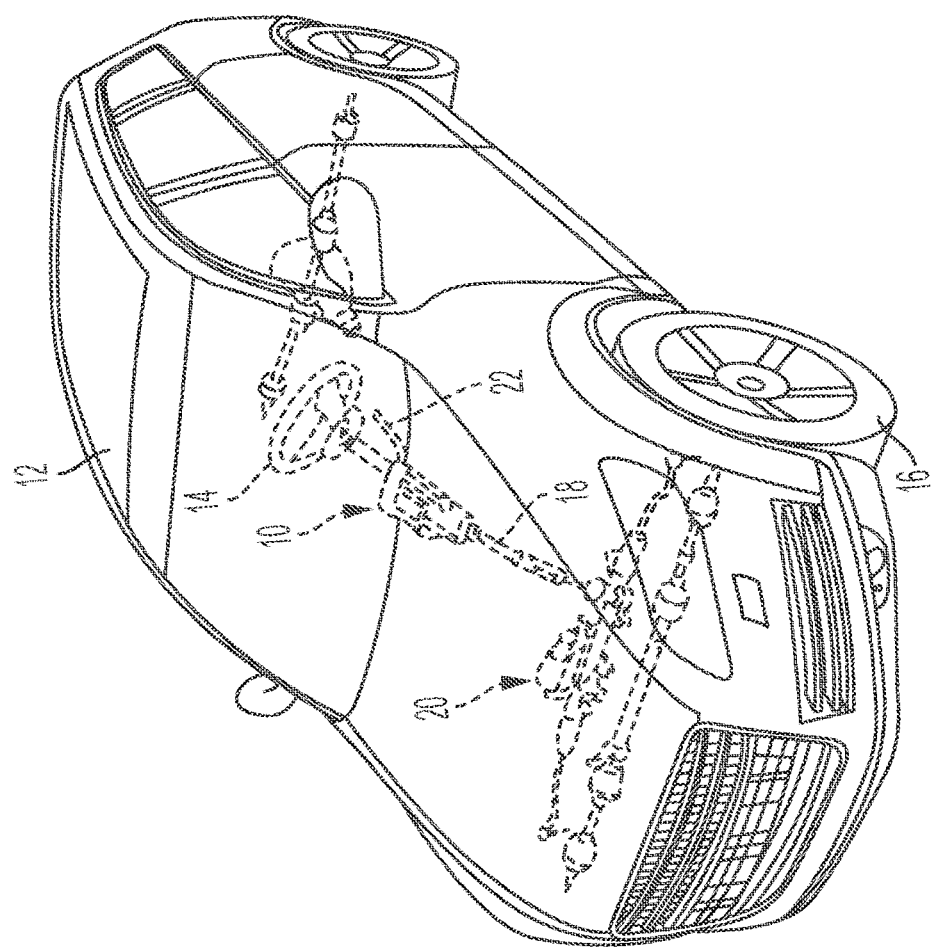
FIG. 1 is a perspective view of a steering column assembly disposed in a vehicle.

FIG. 1 illustrates a steering column assembly 10 disposed in a vehicle 12. The steering column assembly 10 operatively connects a steering device, such as a steering wheel 14, to road wheels 16 for control of the road wheels 16. Various types of steering column assemblies 10 may be employed. In the illustrated embodiment, the steering column assembly 10 includes one or more steering shafts 18 surrounded by one or more jackets to couple the steering wheel 14 to a mechanism 20 that is configured to manipulate the road wheels 16 in response to input from the steering wheel 14. The steering column assembly 10 may be adjusted in one or more directions, such as in a telescoping manner or in a tilting manner. A rake and/or tilt lever 22 that facilitates rake and/or tilting motion of the steering column assembly 10 is illustrated.

Figure 2:
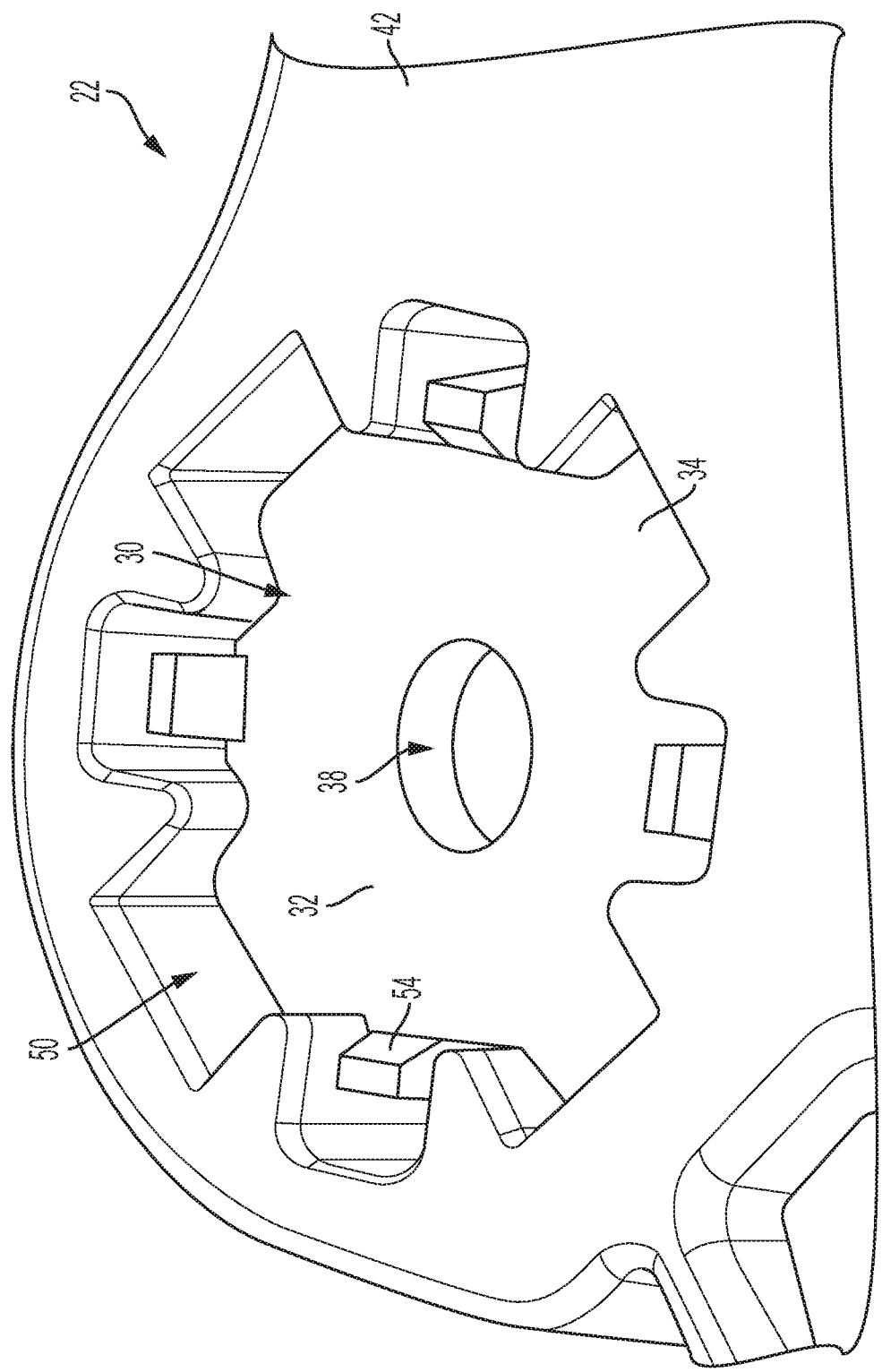
FIG. 2 is a perspective view of an outer side of a lever with an outer cam assembled thereto.
Figure 3:
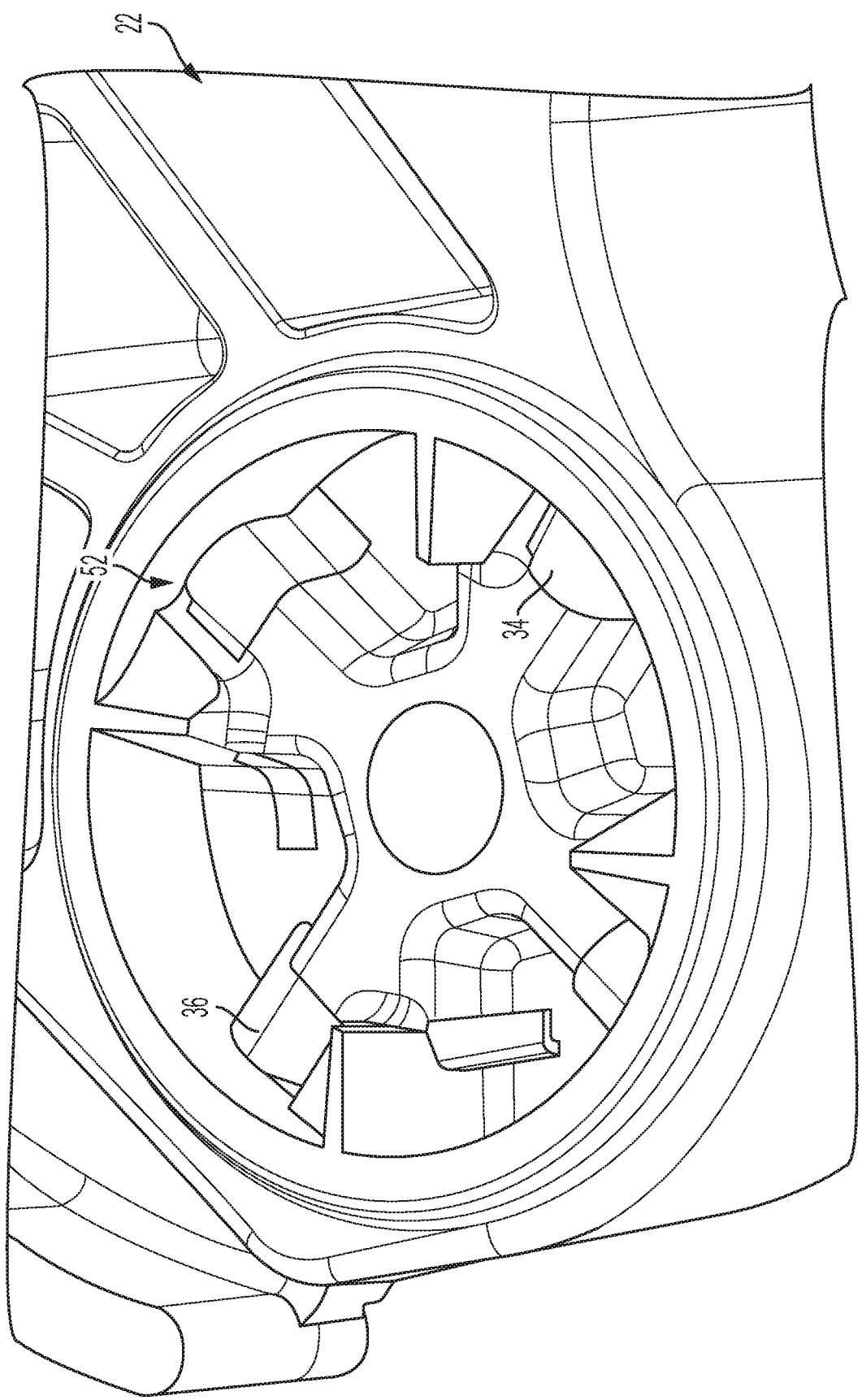
FIG. 3 is a perspective view of an inner side of the lever with the outer cam assembled thereto.
Figure 6:
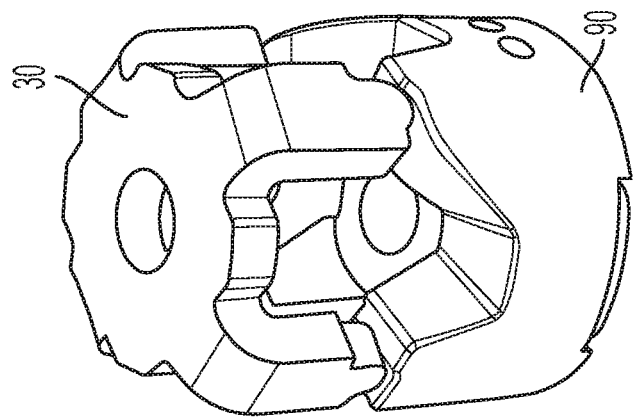
FIG. 6 is a perspective view of the outer cam in contact with the inner cam to place the cam assembly in a locked condition.
Figure 5:
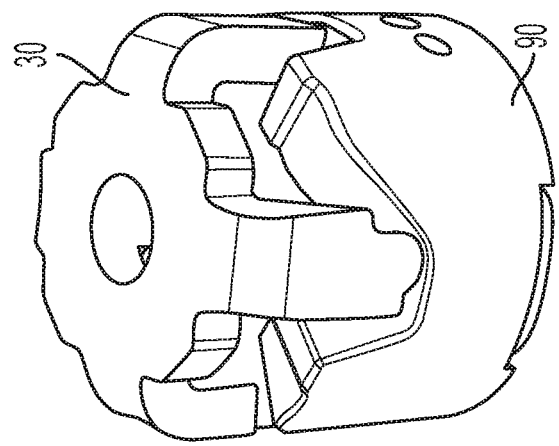
FIG. 5 is a perspective view of the outer cam in contact with an inner cam to place the cam assembly in an unlocked condition.

Referring to FIGS. 2 and 3, the lever 22 is illustrated in more detail. The lever 22, upon rotation by a user, manipulates a cam assembly to selectively unlock (FIG. 5) and lock (FIG. 6) the rake/tilt position of the steering column assembly 10. The cam assembly operates by having an outer cam 30 rotate in response to rotation of the lever 22, with rotation of the outer cam 30 biasing an inner cam 90 (FIGS. 5 and 6) in a translational manner. The biasing occurs to mating cam profiles on an inner face of the outer cam 30 and an outer face of the inner cam 90. The translational movement of the inner cam 90 selectively provides and releases a clamping force on the overall steering column assembly 10 to lock and unlock the rake/tilt position of the steering column assembly 10 for adjustment thereof.

Figure 4:
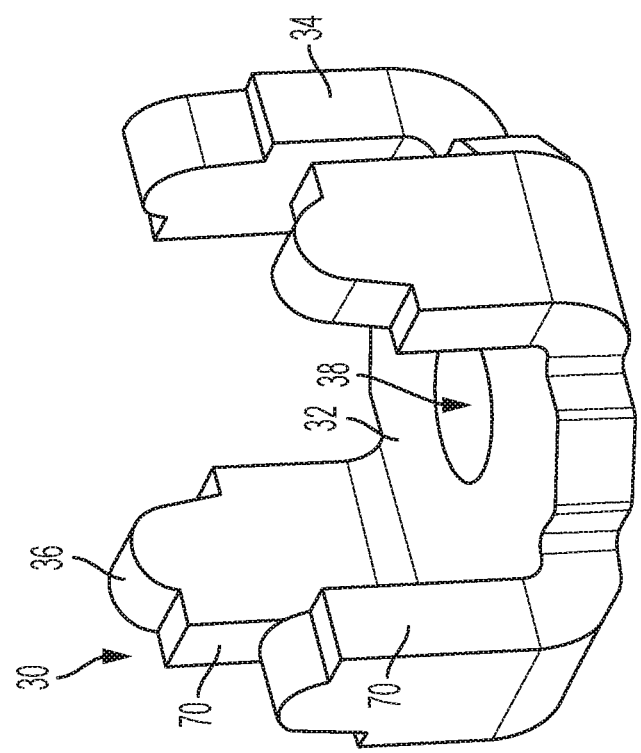
FIG. 4 is a perspective view of the outer cam.

The outer cam 30 is illustrated as being assembled to the lever 22 in FIGS. 2 and 3, and in a perspective manner in FIG. 4. The outer cam 30 is formed of stamped steel. In particular, the outer cam 30 is a single piece of stamped steel. The inner cam 90 may be formed of various materials. In one embodiment, the inner cam 90 is formed of powdered metal, for example.

The outer cam 30 includes a main body 32 and a plurality of legs 34 extending therefrom. Each of the legs 34 have a curved terminal end 36 forming a radius at the end of each leg 34. The radius of each leg 34 interacts with the inner cam (not shown), thereby creating—and releasing—lift and bolt tension. A surface proximate a central aperture 38 defined by the outer cam 30 forms a bolt interface for bolt tension with a bolt extending therethrough.

The outer cam 30 assembles to the lever 22 from an outer face 42 of the lever 22 (FIG. 2), but does not require additional mechanical fastener components to retain the outer cam 30 to the lever 22. The outer cam 30 is fitted within a pocket 50 of the outer face 42 of the lever 22. Each of the plurality of legs 34 of the outer cam 30 extend through respective openings 52 of the pocket 50 of the lever 22. In some embodiments, the legs 34 are press fit within the openings 52 to provide stiffness of the overall assembly (e.g., lever 22 and outer cam 30). In particular, the edges 70 of each of the legs 34 is in contact with surfaces that define the openings 52 in a manner that ensures the press fit relationship.

The outer cam 30 is retained by a rake bolt (not shown) extending through the central aperture 38 of the outer cam 30 due to a press fit condition in some embodiments. Additionally, the outer cam 30 is retained within the pocket 50 with retention features 54 located within the pocket 50. The retention features 54 are tabs or a similar structural retention feature that may be flexibly biased out of the way during insertion of the outer cam 30, yet resiliently moveable back to a retention position after complete insertion of the outer cam 30. In particular, once an outer surface of the outer cam 30 is moved past the retention features 54, a portion of the each of the retention features 54 moves into engagement with the outer surface of the outer cam 30 to prevent withdrawal of the outer cam 30 from the installed position.

The embodiments described herein address issues related to both cost and manufacturing complexity for the use of a stamped steel outer cam. The stamped steel outer cam 30 is pressed into the lever 22 from the outer face 42 of the lever 22, while still avoiding the need for additional fasteners that add part count to the assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A cam assembly for a steering system comprising:
a lever; and
an outer cam formed of stamped steel and press fit within a pocket defined by an outer face of the lever, wherein the outer cam comprises:
a main body; and
a plurality of legs extending from the main body, wherein each of the plurality of legs extend through a respective opening of the lever located within the pocket of the lever.

2. The cam assembly of claim 1, wherein the outer cam includes four legs extending from the main body.

3. The cam assembly of claim 1, wherein the plurality of legs are press fit within the openings.

4. The cam assembly of claim 1, wherein the lever is a rake lever for adjusting a rake position of the steering system.

5. The cam assembly of claim 4, wherein the outer cam defines a central aperture sized to receive a rake bolt therethrough.

6. The cam assembly of claim 5, wherein the rake bolt is press fit to the outer cam within the central aperture.

7. A cam assembly for a steering system comprising:
a lever; and
an outer cam formed of stamped steel and press fit within a pocket defined by an outer face of the lever, wherein the outer cam comprises:
a main body; and
a plurality of legs extending from the main body, wherein each of the plurality of legs includes a curved end.

8. The cam assembly of claim 7, wherein the plurality of legs are press fit within the openings.

9. The cam assembly of claim 7, wherein the lever is a rake lever for adjusting a rake position of the steering system.

10. A cam assembly for a steering system comprising:
a lever; and
an outer cam formed of stamped steel and press fit within a pocket defined by an outer face of the lever, wherein the outer cam comprises:
a main body; and
a plurality of legs extending from the main body, wherein the main body includes an outer surface, and the lever includes a plurality of retention features engaged with an outer surface of the outer cam when the outer cam is in a fully installed position within the pocket to retain the outer cam therein.

11. The cam assembly of claim 10, wherein the plurality of legs are press fit within the openings.

12. The cam assembly of claim 10, wherein the lever is a rake lever for adjusting a rake position of the steering system.

13. A rake adjustment assembly for a steering column system comprising:
a rake lever that is rotatable;
a rake bolt operative coupled to the rake lever and positioned to selectively exert a clamping force to lock and unlock the rake position of the steering column system; and
a cam assembly comprising an outer cam formed of stamped steel and press fit within a pocket defined by an outer face of the lever, the outer cam comprising:
a main body; and
a plurality of legs extending from the main body, wherein each of the plurality of legs extend through a respective opening of the lever located within the pocket of the lever.

14. The rake adjustment assembly of claim 13, wherein the outer cam includes four legs extending from the main body.

15. The rake adjustment assembly of claim 13, wherein the plurality of legs are press fit within the openings.

16. The rake adjustment assembly of claim 13, wherein the outer cam defines a central aperture sized to receive the rake bolt therethrough.

17. The rake adjustment assembly of claim 16, wherein the rake bolt is press fit to the outer cam within the central aperture.

18. A rake adjustment assembly for a steering column system comprising:
a rake lever that is rotatable;

a rake bolt operative coupled to the rake lever and positioned to selectively exert a clamping force to lock and unlock the rake position of the steering column system; and a cam assembly comprising an outer cam formed of stamped steel and press fit within a pocket defined by an outer face of the lever, the outer cam comprising:

a main body; and a plurality of legs extending from the main body, wherein each of the plurality of legs includes a curved end.

19. The rake adjustment assembly of claim 18, wherein the plurality of legs are press fit within the openings.

20. A rake adjustment assembly for a steering column system comprising:

a rake lever that is rotatable;

a rake bolt operative coupled to the rake lever and positioned to selectively exert a clamping force to lock and unlock the rake position of the steering column system; and a cam assembly comprising an outer cam formed of stamped steel and press fit within a pocket defined by an outer face of the lever, the outer cam comprising:

a main body; and a plurality of legs extending from the main body, wherein the main body includes an outer surface, and the lever includes a plurality of retention features engaged with an outer surface of the outer cam when the outer cam is in a fully installed position within the pocket to retain the outer cam therein.

* * * * *